United States Patent
Han et al.

(10) Patent No.: US 9,974,064 B2
(45) Date of Patent: *May 15, 2018

(54) MULTIPLEXING OF CHANNEL STATE INFORMATION AND HYBRID AUTOMATIC REPEAT REQUEST—ACKNOWLEDGEMENT INFORMATION

(71) Applicant: Intel Corporation, Santa Clara, CA (US)

(72) Inventors: Seunghee Han, San Jose, CA (US); Hong He, Beijing (CN); Jong-Kae Fwu, Sunnyvale, CA (US); Shafi Bashar, Santa Clara, CA (US); Debdeep Chatterjee, Mountain View, CA (US); Youn Hyoung Heo, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/479,655

(22) Filed: Apr. 5, 2017

(65) Prior Publication Data
US 2017/0208585 A1    Jul. 20, 2017

Related U.S. Application Data

(63) Continuation of application No. 15/019,915, filed on Feb. 9, 2016, now Pat. No. 9,661,619, which is a (Continued)

(51) Int. Cl.
*H04W 72/04*  (2009.01)
*H04L 1/18*   (2006.01)
*H04L 5/00*   (2006.01)

(52) U.S. Cl.
CPC ....... *H04W 72/0413* (2013.01); *H04L 1/1861* (2013.01); *H04L 5/0055* (2013.01); *H04L 5/0057* (2013.01)

(58) Field of Classification Search
CPC . H04L 1/08; H04L 1/18; H04L 1/1861; H04L 5/0055; H04L 1/1812;
(Continued)

(56) References Cited

U.S. PATENT DOCUMENTS 8,767,661 B2    7/2014  Han et al.
2001/0026593 A1  10/2001  Matsunaga et al.
(Continued)

FOREIGN PATENT DOCUMENTS

CN    101499878 A    8/2009
CN    102281133 A    12/2011
(Continued)

OTHER PUBLICATIONS

International Search Report and Written Opinion dated Dec. 13, 2013 from International Application No. PCT/US2013/053659.
(Continued)

*Primary Examiner* — Mohamed Kamara
(74) *Attorney, Agent, or Firm* — Schwabe, Williamson & Wyatt, P.C.

(57) ABSTRACT

Embodiments of the present disclosure describe devices, methods, computer-readable media and systems configurations for multiplexing channel state information and hybrid automatic repeat request-acknowledgement information. Other embodiments may be described and claimed.

25 Claims, 10 Drawing Sheets

Related U.S. Application Data continuation of application No. 13/934,095, filed on Jul. 2, 2013, now Pat. No. 9,294,230.

(60) Provisional application No. 61/667,325, filed on Jul. 2, 2012, provisional application No. 61/679,627, filed on Aug. 3, 2012.

(58) Field of Classification Search
CPC . H04W 72/0446; H04W 28/04; H04W 48/12; H04W 72/04
See application file for complete search history.

(56) References Cited

U.S. PATENT DOCUMENTS

| | | | |
|---|---|---|---|
| 2009/0109917 | A1 | 4/2009 | Pajukoski et al. |
| 2009/0201869 | A1 | 8/2009 | Xu et al. |
| 2010/0271970 | A1 | 10/2010 | Pan et al. |
| 2010/0272019 | A1 | 10/2010 | Papasakellariou et al. |
| 2012/0087254 | A1 | 4/2012 | Yin et al. |
| 2012/0088533 | A1 | 4/2012 | Khoshnevis et al. |
| 2012/0113831 | A1 | 5/2012 | Pelletier et al. |
| 2012/0207109 | A1 | 8/2012 | Pajukoski et al. |
| 2012/0210187 | A1 | 8/2012 | Yin et al. |
| 2013/0114472 | A1 | 5/2013 | Tamaki et al. |
| 2013/0235768 | A1 | 9/2013 | Earnshaw et al. |

FOREIGN PATENT DOCUMENTS

| | | |
|---|---|---|
| EP | 2385647 A2 | 11/2011 |
| EP | 2582082 A1 | 4/2013 |
| KR | 20110088393 A | 8/2011 |
| WO | WO2010149069 A1 | 12/2010 |
| WO | 2011/157098 A1 | 12/2011 |
| WO | 2012/005516 A2 | 1/2012 |
| WO | 2012/057571 A2 | 5/2012 |

OTHER PUBLICATIONS

Partial Supplementary European Search Report dated Feb. 11, 2016 from European Patent Application No. 13825921.3.

QUALCOMM Incorporated, "On reducing periodic CSI dropping for CA operation," 3GPP TSG RAN WG1 #69, R1-122762, Agenda item: 7.21.2.1, May 21-25, 2012, Prague, Czech Republic, 8 pages.

3GPP, "Technical Specification Group Radio Access Network; Evolved Universal Terrestrial Radio Access (E-UTRA); Physical layer procedures (Release 10)," 3GPP TS 36.213 V10.6.0 (Jun. 2012), Jun. 26, 2012, Ltd Advanced, 125 pages.

Extended European Search Report dated Apr. 13, 2016 from European Patent Application No. 13825921.3.

ZTE, "REmaining Issues of UL Channel Combinations for Rel-10," 3GPP TSG RAN WG1 Meeting #64, R1-110808, Agenda Item: 6.2.1, Feb. 21-Feb. 25, 2011, Taipei, 6 pages.

3GPP, "Technical Specification Group Radio Access Network; Evolved Universal Terrestrial Radio Access (E-UTRA); Physical layer procedures (Release 10)," 3GPP TS 36.213 V10.6.0 (Jun. 2012), Lte Advanced, 125 pages.

Second Office Action dated Nov. 3, 2017 from Chinese Patent Applcation No. 201380035928.7, 14 pages.

Extended European Search Report dated Mar. 13, 2017 from European Divisional Application No. 18151568.5, 10 pages.

Huawei et al., "Simultaneous transmission of periodic CSI and HARQ-ACK," 3GPP TSG RAN WG1 Meeting #69, R1-121937, Agenda Item: 7.2.1.2.2, May 21-25, 2012, Prague, Czech Republic, 4 pages.

MULTIPLEXING OF CHANNEL STATE INFORMATION AND HYBRID AUTOMATIC REPEAT REQUEST—ACKNOWLEDGEMENT INFORMATION

CROSS REFERENCE TO RELATED APPLICATIONS

The present application is a continuation of U.S. patent application Ser. No. 15/019,915, filed Feb. 9, 2016, entitled "MULTIPLEXING OF CHANNEL STATE INFORMATION AND HYBRID AUTOMATIC REPEAT REQUEST-ACKNOWLEDGEMENT INFORMATION," which is a continuation of U.S. patent application Ser. No. 13/934,095, filed Jul. 2, 2013, entitled "MULTIPLEXING OF CHANNEL STATE INFORMATION AND HYBRID AUTOMATIC REPEAT REQUEST-ACKNOWLEDGEMENT INFORMATION," which claims priority to U.S. Provisional Patent Application No. 61/667,325, filed Jul. 2, 2012, entitled "ADVANCED WIRELESS COMMUNICATION SYSTEMS AND TECHNIQUES," and to U.S. Provisional Patent Application No. 61/679,627, filed Aug. 3, 2012, entitled "ADVANCED WIRELESS COMMUNICATION SYSTEMS AND TECHNIQUES," the entire disclosures of which are hereby incorporated by reference.

FIELD

Embodiments of the present invention relate generally to the field of wireless communications, and more particularly, to multiplexing channel state information and hybrid automatic repeat request-acknowledgement information.

BACKGROUND

In Release 10 of the $3^{rd}$ Generation Partnership Project (3GPP) Long Term Evolution-Advanced (LTE-A) standard, a conflict may occur when a user equipment is configured for carrier aggregation and the timing for multi-cell hybrid automatic repeat request-acknowledgement (HARQ-ACK) transmission using by a physical uplink control channel (PUCCH) format 1b with channel selection and for CSI using PUCCH format 2 is overlapped in the same subframe. In such an event, the UE drops the CSI and transmits the HARQ-ACK information using PUCCH format 1b with channel selection. However, the frequent dropping of the CSI due to collision between the CSI and the HARQ-ACK information may result in downlink throughput loss due to the unavailability of proper CSI feedback.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for multiplexing channel state information (CSI) and hybrid automatic repeat request-acknowledgement (HARQ-ACK) information. Embodiments described may enhance downlink throughput while reducing a dropping loss of CSI or HARQ-ACK information.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrase "A and/or B" means (A), (B), or (A and B). The phrases "A/B" and "A or B" mean (A), (B), or (A and B), similar to the phrase "A and/or B."

As used herein, the term "module" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the module may execute one or more software or firmware programs to provide at least some of the described functionality.

Figure 1:
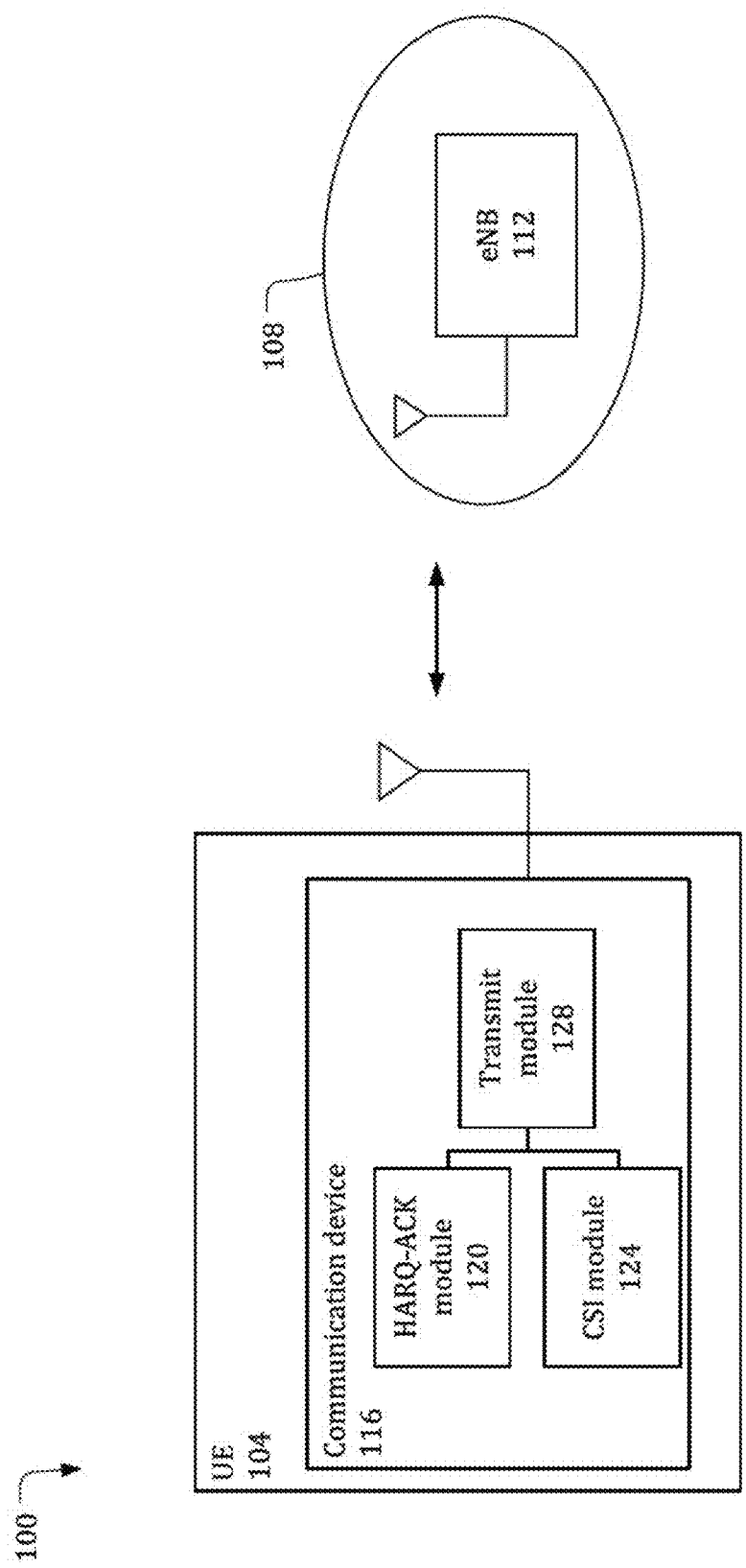
FIG. 1 schematically illustrates a network environment in accordance with various embodiments.

FIG. 1 schematically illustrates a network environment 100 in accordance with various embodiments. The network environment 100 includes a user equipment (UE) 104 wirelessly coupled with a radio access network (RAN) 108. The RAN 108 may include an enhanced node base station (eNB) 112 configured to communicate with the UE 104 via an over-the-air (OTA) interface. The RAN 108 may be part of a 3GPP LTE Advanced (LTE-A) network and may be referred to as an evolved universal terrestrial radio access network (EUTRAN). In other embodiments, other radio access network technologies may be utilized.

The UE 104 may include a communication device 116 that implements various communication protocols in order to effectuate communication with the RAN 108. The communication device 116 may be a chip, chipset, or other collection of programmed and/or pre-configured circuitry. In some embodiments, the communication device 116 may include or be part of baseband circuitry, a radio transceiver circuitry, etc.

The communication device 116 may include a HARQ-ACK module 120, a channel state information (CSI) module 124, and a transmit module 128 coupled with one another at least as shown.

The HARQ-ACK module 120 may implement various HARQ processes. For example, in some embodiments, the HARQ-ACK module 120 may determine whether downlink data was correctly received on a Physical Downlink Shared Channel (PDSCH). The HARQ-ACK module 120 may generate HARQ-ACK bit stream, which includes acknowledgement/negative acknowledgement (ACK/NACK) bits, to indicate whether codewords of a downlink transmission were successfully received. In some embodiments, the HARQ-ACK module 120 may generate one ACK/NACK bit for a single codeword downlink transmission and two ACK/NACK bits for a two-codeword downlink transmission. The ACK/NACK bits that correspond to a PDSCH transmission in subframe i-k may be transmitted in subframe i. The value k may be different in various embodiments and may depend on, for example, a frame structure type, a time division duplex (TDD) uplink/downlink (UL/DL) configuration, etc. The value k may be equal to four in some FDD embodiments. In some embodiments, the HARQ processes may be in accordance with relevant technical specifications, for example, 3GPP Technical Specification (TS) 36.213 V10.6.0 (26 Jun. 2012).

The CSI module 124 may control generation and transmission of various CSI components that relate to channel state. The CSI components could include, but are not limited to, channel quality indicator (CQI), precoding matrix indicator (PMI), rank indicator (RI), and precoding type indicator (PTI). In some embodiments, the UE 104 may be semi-statically configured by higher layers to periodically feedback the various CSI components on the PUCCH. In some embodiments, the CSI feedback may be in accordance with relevant technical specifications, for example, 3GPP TS 36.213.

The transmit module 128 may be coupled with both the HARQ-ACK module 120 and the CSI module 124. The transmit module 128 may receive a HARQ bit stream from the HARQ-ACK module 120 and a CSI bit stream from the CSI module 124. In some embodiments, a scheduling conflict (or collision) may occur when attempting to encode the HARQ bit stream and the CSI bit stream for transmission. For example, this may occur when the CSI bit stream, which may correspond to a one-cell periodic CSI, is to be transmitted using PUCCH format 2 and the HARQ bit stream, which may correspond to a multi-cell HARQ-ACK, is to be transmitted using PUCCH format 1b with channel selection.

PUCCH format 2 may be used, for example, to report wideband CQI/PMI and, in some embodiments, may include up to 11 bits. The CSI transmitted by PUCCH format 2 can be the final CSI for a certain downlink (DL) cooperative multipoint (CoMP) set and/or for a certain serving cell in a carrier aggregation (CA) scheme. Hereafter, the CA case may be assumed for convenience; however, similar concepts may be equally applicable for DL CoMP CSI feedback, which may require a greater number of CSI bits than a single cell operation.

PUCCH format 1b with channel selection may be used so that some of the HARQ-ACK information to be conveyed is indicated by selecting one of a number of possible PUCCH resources. PUCCH format 1b with channel selection may be utilized for UEs that support no more than four ACK/NACK bits and are configured with up to two component carriers (CCs) in a CA scheme. The payload sizes for HARQ-ACK information using PUCCH format 1b with channel selection may be vary from two to four bits.

If a transmission resource, for example, PUCCH format 2, that is to be used for both the CSI and the HARQ-ACK has a payload size of up to, for example, 13 bits, then a scheduling conflict may occur when a total number of uplink control information (UCI) bits, which may include both the ACK/NACK bits and the CSI bits, is over 13 bits. With up to 11 bits for the CSI and up to 4 bits for the HARQ-ACK, the UCI may include up to 15 bits, for example.

Upon detecting a potential scheduling conflict, the transmit module 128 may perform various resolution processes in the transmitting of the UCI.

Figure 2:
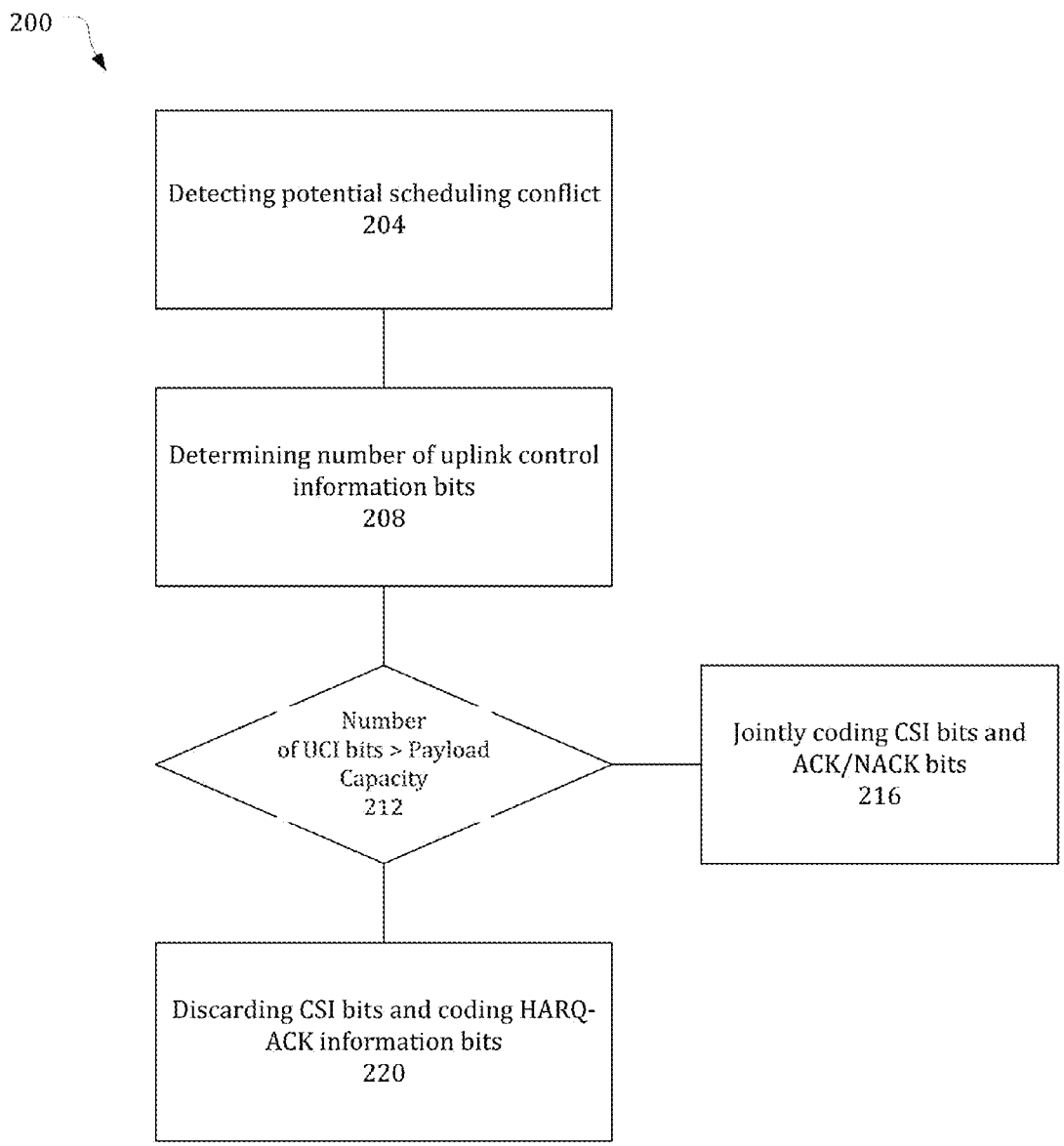
FIG. 2 illustrates a method of transmitting uplink control information (UCI) in accordance with various embodiments.

FIG. 2 illustrates a method 200 in accordance with some embodiments. Method 200 may be performed by a transmit module of a UE, such as transmit module 128 of UE 104. In some embodiments, the UE may include and/or have access to one or more computer-readable media having instructions stored thereon, that, when executed, cause the UE, or the transmit module 128, to perform some or all of the method 200.

For purposes of the present discussion, A may refer to a number of UCI bits, which may depend on the transmission format; A' may refer to a number of CSI bits (for example, A'=4, 5, . . . 11), C may refer to a maximum payload size that may be conveyed by PUCCH format 2 (for example, C=11 or 13), N may refer to a number of ACK/NACK bits for channel selection (for example, N=2, 3, or 4), a CSI bit stream may be represented by $a_0', a_1', a_2', a_3', \ldots, a_{A'-1}'$, and a HARQ-ACK bit stream may be represented by $a_0'', a_1'', \ldots, a_{N-1}''$.

At 204, the method 200 may include detecting a potential scheduling conflict. As mentioned above, a potential scheduling conflict may occur when the CSI bit stream is to be transmitted using PUCCH format 2 and the HARQ bit stream is to be simultaneously transmitted using PUCCH format 1b with channel selection. In some embodiments, detection of a potential scheduling conflict may be done when a particular parameter is set. For example, this may be when simultaneousAckNackAndCQI, or an updated parameter such as simultaneousAckNackAndCQI-ChSel-rX for PUCCH format 1b with channel selection where X is a release-dependent number (e.g., 12), is true. In some embodiments, the parameter may be set by RRC signaling as described in 3GPP TS 36.331 v9.10.0 (14 Mar. 2012), for example.

At 208, the method 200 may include determining a number of UCI bits to be transmitted in a PUCCH transmission of a subframe. As mentioned above, the UCI bits may include ACK/NACK bits and CSI bits. In some embodiments, the UCI bits may further include one or more scheduling request (SR) bits.

At 212, the method 200 may include determining whether number of UCI bits is greater than a payload size capable of being conveyed by the PUCCH transmission of a subframe. In various embodiments, a payload capacity of a PUCCH transmission, having format 2, may be 13 bits, given capabilities of presently-available Reed-Muller (RM) coding.

If it is determined that the number of UCI bits to be transmitted is not greater than the payload size, then the method 200 may include, at 216, jointly coding CSI bits and ACK/NACK bits. The CSI and ACK/NACK bits may be multiplexed together and jointly coded for transmission on, for example, a PUCCH format 2 resource.

Figure 3:
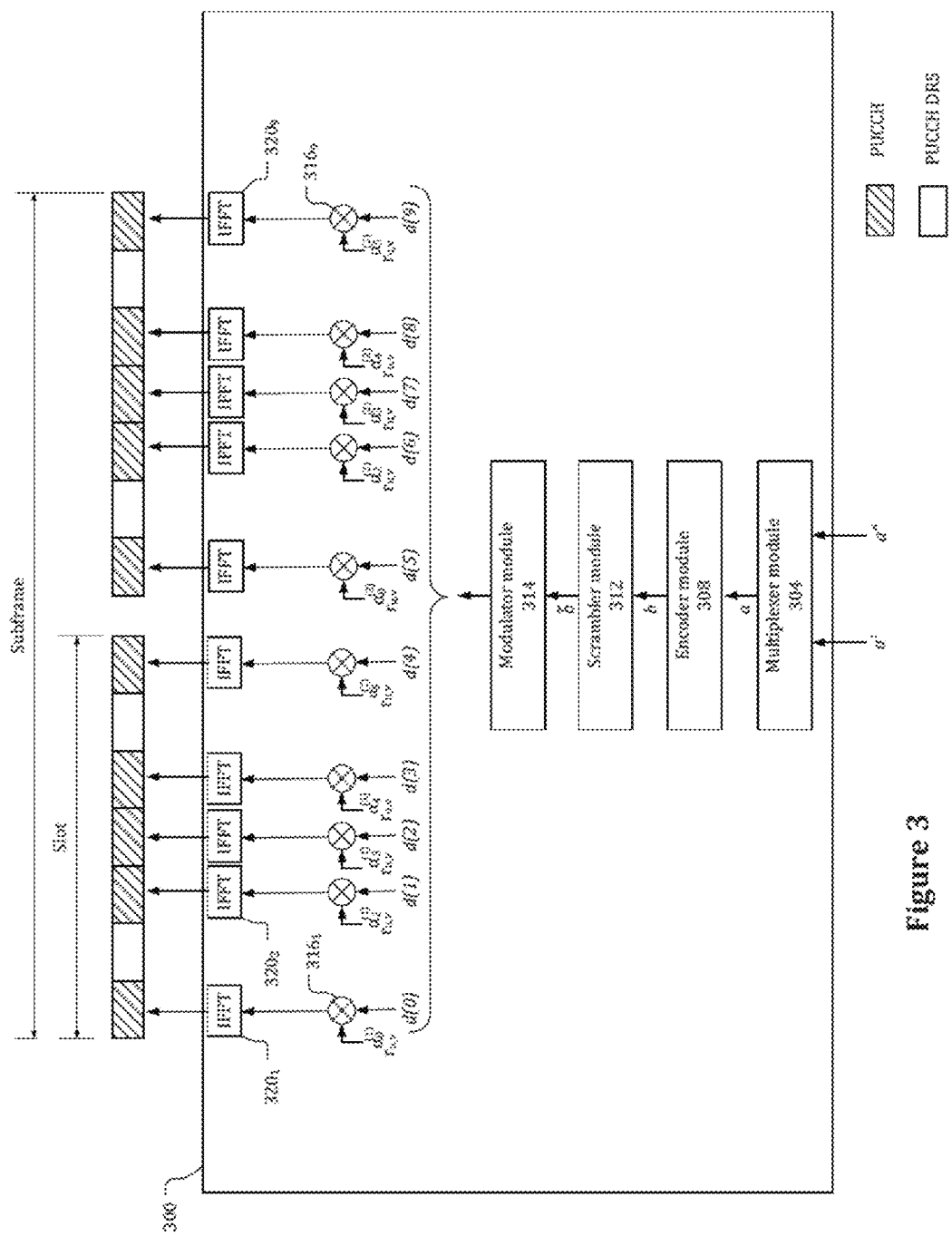
FIG. 3 schematically illustrates a transmit module in accordance with various embodiments.

FIG. 3 illustrates a transmit module 300 that may be capable of multiplexing the CSI and ACK/NACK bits and jointly coding them on a PUCCH format 2 resource in accordance with some embodiments. The transmit module 300 may be similar to and substantially interchangeable with transmit module 128. Transmit module 300 may be a time domain structure of PUCCH format 2 for normal cyclical prefix (CP). In other embodiments, other structures may be used.

A multiplexer module 304 may multiplex the CSI bit stream with the HARQ-ACK information bit stream to yield a UCI bit stream, a, according to Equation 1.

$$[a_0, a_1, a_2, a_3, \ldots, a_{A-1}] = [a_0', a_1', a_2', a_3', \ldots, a_{A'-1}', a_0'', a_1'', \ldots, a_{N-1}'']$$ Equation 1

While the multiplexing of Equation 1 is shown with the HARQ-ACK information bit stream added to the end of the CSI bit stream, other embodiments may use other manners of multiplexing. For example, in another embodiment, the CSI bit stream may be added to the end of the HARQ-ACK bit stream. In still another embodiment, the CSI bit stream and HARQ-ACK bit stream may be interleaved with one another.

If SR is to be transmitted in the same subframe without an uplink shared channel (UL-SCH), the SR may also be multiplexed with the CSI and ACK/NACK bits. In some embodiments, the SR bit may be multiplexed at an end of the ACK/NACK bits. In some embodiments, an SR bit '1' may represent a positive SR and an SR bit '0' may represent a negative SR.

The UCI bit stream may be coded, by encoder module 308, using RM coding, tailbiting convolutional coding (TBCC), or some other suitable coding process to provide an encoded bit stream b. In some embodiments, the UCI bit stream may be coded according to a (20, A) RM code. The code words of the (20, A) RM code may be a linear combination of the 13 basis sequences denoted $M_{i,n}$ and defined in Table 1.

TABLE 1

Basis sequences for (20, A) code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

The bits of the encoded bit stream may be denoted by $b_0, b_1, b_2, b_3, \ldots, b_{B-1}$ where B=20 and with $$b_i = \sum_{n=0}^{A-1} (a_n \cdot M_{i,n}) \bmod 2,$$ Equation 2 where i=0, 1, 2, ..., B−1.

The encoded bit stream may be scrambled, by scrambler module 312, with a UE-specific scrambling sequence to provide a scrambled bit stream having scrambled bits $\tilde{b}(0), \ldots, \tilde{b}(19)$ according to $$\tilde{b}(i) = (b(i) + c(i)) \bmod 2,$$ Equation 3 where the scrambling sequence c(i) is a pseudo-random sequence (for example, a Gold sequence, pseudo-noise (PN) sequence, Kasami sequence, etc.). A scrambling sequence generator, which may be part of an encoder module 308, may be initialized with $$c_{init} = (\lfloor n_s/2 \rfloor + 1) \cdot (2N_{ID}^{cell} + 1) \cdot 2^{16} + n_{RNTI}$$ Equation 4 at the start of each subframe where $n_{RNTI}$ is a cell radio network temporary identifier (C-RNTI).

The scrambled bits $\tilde{b}(0), \ldots, \tilde{b}(19)$ may be modulated by modulator module 312. In some embodiments, the modulator module 314 may employ a quadrature phase shift keying (QPSK) modulation, resulting in a block of complex-valued modulation symbols d(0), ..., d(9).

Each complex-valued symbol d(0), ..., d(9) may be multiplied, by multiplier modules $316_{1-9}$, with a cyclically shifted length $N_{seq}^{PUCCH}=12$ sequence $r_{u,v}^{(\alpha_{\tilde{p}})}(n)$ for each of the P antenna ports used for PUCCH transmission according to $$z^{(\tilde{p})}(N_{seq}^{PUCCH} \cdot n + i) = \frac{1}{\sqrt{P}} d(n) \cdot r_{u,v}^{(\alpha_{\tilde{p}})}(i)$$ Equations 5-7

-continued $$n = 0, 1, \ldots, 9$$

$$i = 0, 1, \ldots, N_{sc}^{RB} - 1$$

where $r_{u,v}^{(\alpha_{\tilde{p}})}(i)$ may be defined by section 5.5.1 of 3GPP TS 36.211 v10.5.0 (26 Jun. 2012) with $M_{sc}^{RS} = N_{seq}^{PUCCH}$.

Resources used for transmission of PUCCH formats 2/2a/2b may be identified by a resource index $n_{PUCCH}^{(2,\tilde{p})}$ from which the cyclic shift $\alpha_{\tilde{p}}(n_s, l)$ is determined according to $$\alpha_{\tilde{p}}(n_s, l) = 2\pi \cdot n_{cs}^{(\tilde{p})}(n_s, l) / N_{sc}^{RB}, \quad \text{Equation 8}$$

where $$n_{cs}^{(\tilde{p})}(n_s, l) = (n_{cs}^{cell}(n_s, l) + n'_{\tilde{p}}(n_s)) \bmod N_{sc}^{RB} \quad \text{Equation 9}$$

and $$n'_{\tilde{p}}(n_s) = \quad \text{Equation 10}$$

$$\begin{cases} n_{PUCCH}^{(2,\tilde{p})} \bmod N_{sc}^{RB} & \text{if } n_{PUCCH}^{(2,\tilde{p})} < N_{sc}^{RB} N_{RB}^{(2)} \\ (n_{PUCCH}^{(2,\tilde{p})} + N_{cs}^{(1)} + 1) \bmod N_{sc}^{RB} & \text{otherwise} \end{cases}$$

for $n_s \bmod 2 = 0$ and by $$n'_{\tilde{p}}(n_s) = \quad \text{Equation 11}$$

$$\begin{cases} [N_{sc}^{RB}(n'_{\tilde{p}}(n_s - 1) + 1)] \bmod (N_{sc}^{RB} + 1) - 1 & \text{if } n_{PUCCH}^{(2,\tilde{p})} < N_{sc}^{RB} N_{RB}^{(2)} \\ (N_{sc}^{RB} - 2 - n_{PUCCH}^{(2,\tilde{p})}) \bmod N_{sc}^{RB} & \text{otherwise} \end{cases}$$

for $n_s \bmod 2 = 1$.

For PUCCH formats 2a and 2b, supported for normal cyclic prefix only, the bit(s) b(20), . . . , b(M$_{bit}$−1) may be modulated as described in Table 2 resulting in a single modulation symbol d(10) used in the generation of the reference signal (RS) for PUCCH format 2a and 2b as described in section 5.4.2 of 3GPP TS 36.211 v10.5.0.

TABLE 2

| PUCCH format | b(20), . . . , b(M$_{bit}$ − 1) | d(10) |
|---|---|---|
| 2a | 0 | 1 |
|  | 1 | −1 |
| 2b | 00 | 1 |
|  | 01 | −j |
|  | 10 | j |
|  | 11 | −1 |

The shifted symbols may then be transformed by respective inverse Fast Fourier Transform modules $320_{1-9}$ for transmission on respective PUCCH resource blocks. As can be seen in FIG. 3, resource blocks 1, 3, 4, 5, and 7 of the first and second slots may be PUCCH resource blocks, while resource blocks 2 and 6 are PUCCH demodulation reference signal (DRS) resource blocks.

In another embodiment, dual RM coding may be used to jointly code the CSI and ACK/NACK bits. Although any RM coding may be used, for example, (32, O) or (20, A), (20, A) may be assumed for purposes of discussion.

In another embodiment using dual RM coding, a first RM encoder can be used for the channel coding of first UCI and a second RM encoder can be used for the channel coding for a second UCI, where the first UCI may be CSI bits and the second UCI may be ACK/NACK bits or vice versa.

Figure 4:
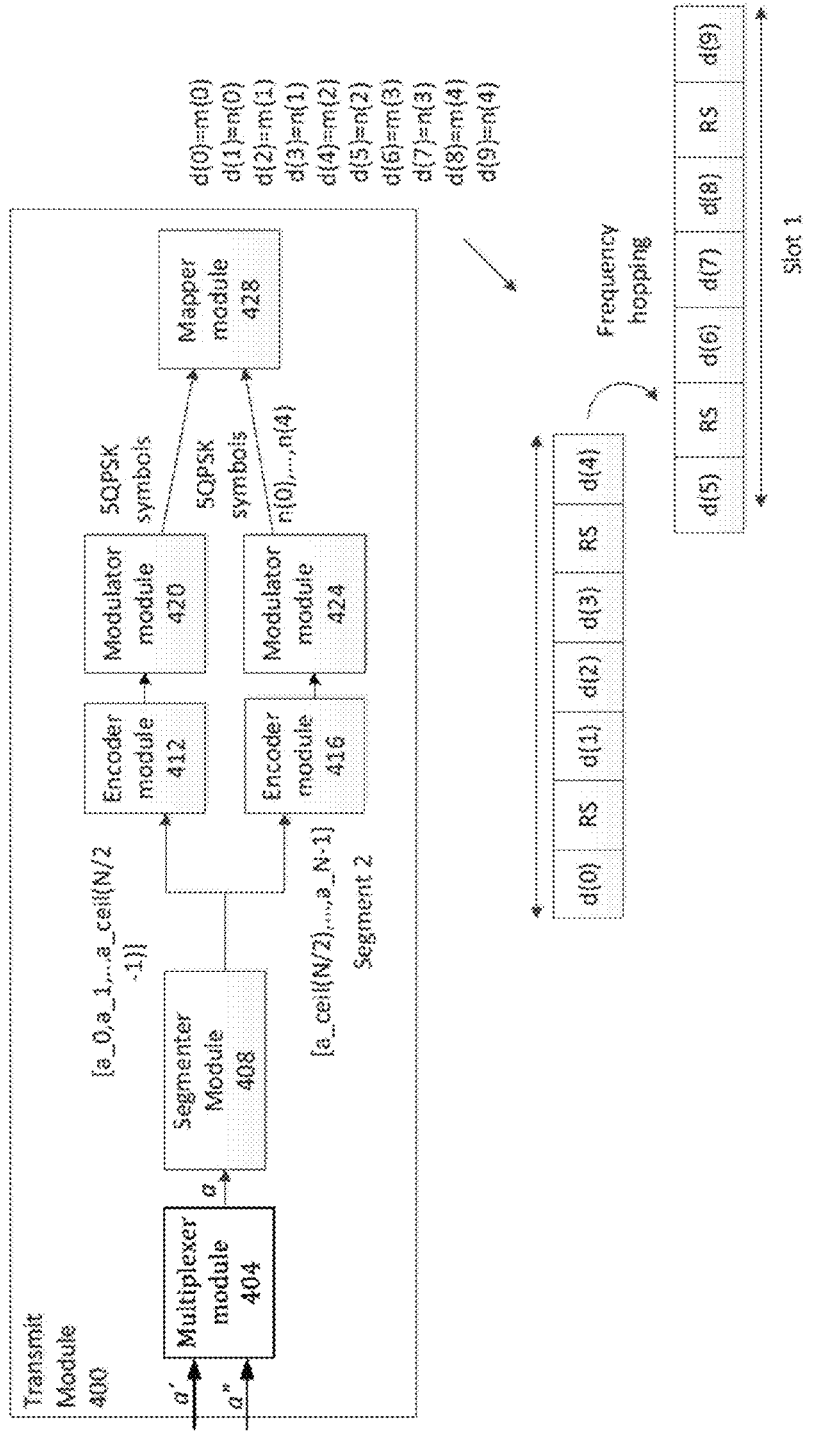
FIG. 4 schematically illustrates a transmit module in accordance with various embodiments.

FIG. 4 illustrates a transmit module 400 in accordance with some embodiments. The transmit module 400 may be similar to and substantially interchangeable with transmit module 128. The transmit module 400 may be configured to provide dual RM coding for PUCCH format 2.

The transmit module 400 may include a multiplexer module 404 to multiplex the CSI bit stream with the ACK/NACK bit stream to yield the UCI bit stream similar to that discussed above.

The transmit module 400 may include a segmenter module 408 to segment the UCI bit stream into two parts. Each segment may be provided to a respective encoder module 412 and 416. The encoder modules 412 and 416 may be (20, A) RM encoders to encode the segmented bit streams.

The transmit module 400 may further include modulator modules 420 and 424 respectively coupled with the encoder modules 412 and 416. The modulator modules 420 and 424 may modulate the encoded bit streams, with QPSK modulation, for example, and provide five QPSK symbols each.

The transmit module 400 may further include a mapper module 428 coupled with the modulator modules 420 and 424 to receive the QPSK symbols. The mapper module 428 may alternatively map the 10 QPSK symbols as d(0)-d(9) for transmission on PUCCH format 2 resources.

In some embodiments, the mapper module 428 may be placed before the modulator modules 420 and 424. Such embodiments may provide a similar alternative mapping operation by mapping two bits from each segment in an alternative manner. Then, QPSK modulation may be applied.

In some embodiments, the joint coding of the CSI and ACK/NACK bits may be done with TBCC. A TBCC with constraint length of seven and a mother coding rate of ⅓ may be described below.

Figure 5:
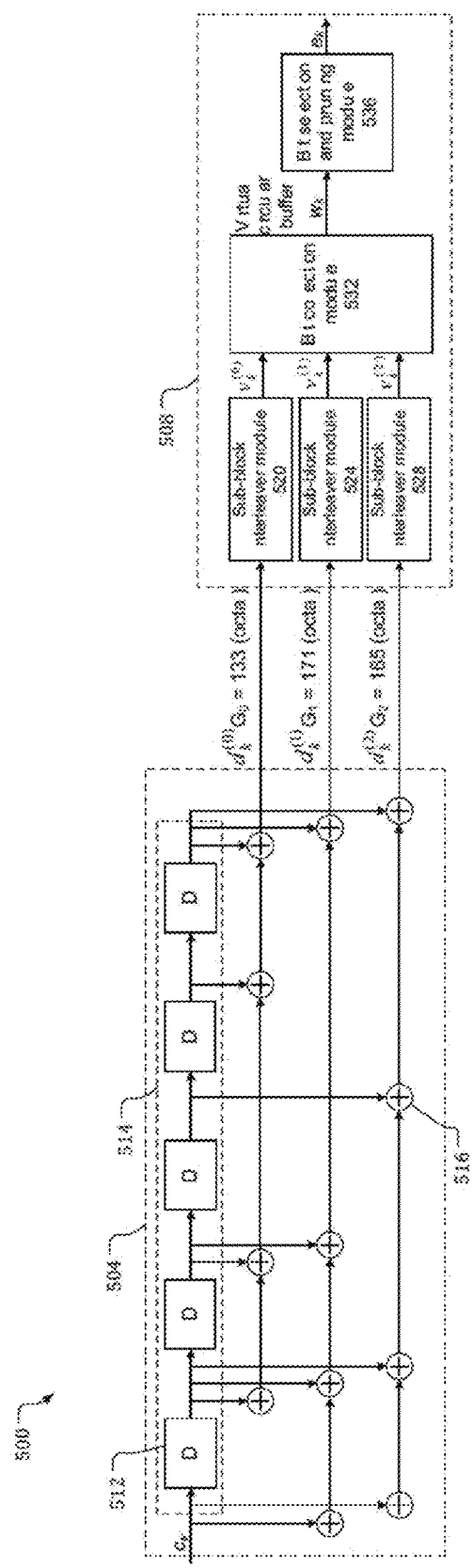
FIG. 5 schematically illustrates an encoder module in accordance with various embodiments.

FIG. 5 illustrates an encoder module 500 that may be used in the transmit module 128 in accordance with various embodiments. The encoder module 500 may be a mother coding rate ⅓ tail biting convolutional encoder having an encoding section 504 and a rate matching section 508.

The encoding section 504 may include delay modules 512, serially coupled with one another, of a shift register 514 coupled with adder modules 516 as shown. An initial value of the shift register 514 of the encoding section 504 may be set to values corresponding to the last six information bits of an input stream, which may be the UCI bit stream, so that the initial and final stages of the shift register 514, corresponding to outputs of the first and last delay modules 512, respectively, are the same. Therefore, denoting the shift register 514 of the encoding section 504 by $s_0, s_1, s_2, \ldots, s_5$, then the initial value of the shift register may be set to $s_i = c_{(K-1-i)}$.

The encoding section output streams, $d_k^{(0)}, d_k^{(1)}$ and $d_k^{(2)}$, may correspond to the first, second, and third parity streams, respectively, as shown in FIG. 5.

The rate matching section 508 may include sub-block interleaver modules 520, 524, and 528 coupled with the encoding section 504 to respectively receive and subsequently interleave the output streams of the encoding section 504.

The bits input to the sub-block interleaver modules 520, 524, and 528 may be denoted by $d_0^{(i)}, d_1^{(i)}, d_2^{(i)}, \ldots, d_{D-1}^{(i)}$, where D is the number of bits. The interleaved streams may be derived as follows.

First, assign $C_{subblock}^{CC} = 32$ to be the number of columns of a matrix. The columns of the matrix may be numbered 0, 1, 2, . . . , $C_{subblock}^{CC} - 1$ from left to right.

Second, determine a number of rows of the matrix $R_{subblock}^{CC}$ by finding a minimum integer $R_{subblock}^{CC}$ such that $D \leq (R_{subblock}^{CC} \times C_{subblock}^{CC})$. The rows of the rectangular matrix may be numbered $0, 1, 2, \ldots R_{subblock}^{CC}-1$ from top to bottom.

Third, if $R_{subblock}^{CC}$, then $N_D = (R_{subblock}^{CC} \times C_{subblock}^{CC} - D)$ dummy bits may be padded such that $y_k = <NULL>$ for $k=0, 1, \ldots, N_D-1$. Then, $y_{N_D+k} = d_k^{(i)}$, $k=0, 1, \ldots, D-1$, and the bit sequence $y_k$ is written into the $(R_{subblock}^{CC} \times C_{subblock}^{CC})$ matrix row by row starting with bit $y_0$ in column 0 or row 0:

$$\begin{bmatrix} y_0 & y_1 & y_2 & \cdots & y_{C_{subblock}^{CC}-1} \\ y_{C_{subblock}^{CC}} & y_{C_{subblock}^{CC}+1} & y_{C_{subblock}^{CC}+2} & \cdots & y_{2C_{subblock}^{CC}-1} \\ \vdots & \vdots & \vdots & \ddots & \vdots \\ y_{(R_{subblock}^{CC}-1) \times C_{subblock}^{CC}} & y_{(R_{subblock}^{CC}-1) \times C_{subblock}^{CC}+1} & y_{(R_{subblock}^{CC}-1) \times C_{subblock}^{CC}+2} & \cdots & y_{(R_{subblock}^{CC} \times C_{subblock}^{CC}-1)} \end{bmatrix}$$

Fourth, perform inter-column permutation for the matrix based on the pattern $\langle P(j) \rangle_{j \in \{0, 1, \ldots, C_{subblock}^{CC}-1\}}$ that is shown in Table 3,

TABLE 3

Inter-column permutation for sub-block interleaver module

| Number of columns $C_{subblock}^{CC}$ | Inter-column permutation pattern $<P(0), P(1), \ldots, P(C_{subblock}^{CC}-1)>$ |
| --- | --- |
| 32 | <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30> | where $P(j)$ is an original column position of the $j^{th}$ permuted column. After permutation of the columns, the intercolumn permuted $(R_{subblock}^{CC} \times C_{subblock}^{CC})$ matrix may be equal to:

$$\begin{bmatrix} y_{P(0)} & y_{P(1)} & y_{P(2)} & \cdots & y_{P(C_{subblock}^{CC}-1)} \\ y_{P(0)+C_{subblock}^{CC}} & y_{P(1)+C_{subblock}^{CC}} & y_{P(2)+C_{subblock}^{CC}} & \cdots & y_{P(C_{subblock}^{CC}-1)+C_{subblock}^{CC}} \\ \vdots & \vdots & \vdots & \ddots & \vdots \\ y_{P(0)+(R_{subblock}^{CC}-1) \times C_{subblock}^{CC}} & y_{P(1)+(R_{subblock}^{CC}-1) \times C_{subblock}^{CC}} & y_{P(2)+(R_{subblock}^{CC}-1) \times C_{subblock}^{CC}} & \cdots & y_{P(C_{subblock}^{CC}-1)+(R_{subblock}^{CC}-1) \times C_{subblock}^{CC}} \end{bmatrix}$$

Fifth, the output of the sub-block interleaver modules 520, 524, and 528 may be the bit sequence read out column by column from the inter-column permuted $(R_{subblock}^{CC} \times C_{subblock}^{CC})$ matrix. The bits after sub-block interleaving may be denoted by $(R_{subblock}^{CC} \times C_{subblock}^{CC})$, where $v_0^{(i)}$ corresponds to $y_{P(0)}$, $v_1^{(i)}$ to $y_{P(0)+C_{subblock}^{CC}}$, ... and $K_\Pi = (R_{subblock}^{CC} \times C_{subblock}^{CC})$. The interleaved streams, as shown in FIG. 5, may include $v_k^{(0)}$, $v_k^{(1)}$, and $v_k^{(2)}$ respectively provided by sub-block interleaver modules 520, 524, and 528.

The sub-block interleaver modules 520, 524, and 528 may also be used in interleaving PDCCH modulation symbols. In that case, the input bit sequence may include PDCCH symbol quadruplets.

The rate matching section 508 may further include a bit collection module 532 coupled with the sub-block interleaver modules 520, 524, and 528 to receive the interleaved streams and a bit selection and pruning module 536 coupled with the bit collection module 532.

The bit collection module 532 may provide a virtual circular buffer to provide a bit-collection bit stream having a length of $K_w = 3K_\Pi$ that is generated as follows:
$w_k = v_k^{(0)}$ for $k=0, \ldots, K_\Pi-1$
$w_{K_\Pi+k} = v_k^{(1)}$ for $k=0, \ldots, k_\Pi-1$, and
$w_{2K_\Pi+k} = v_k^{(2)}$ for $k=0, \ldots, K_\Pi-1$.

The rate matching output bit sequence may be $e_k$, $k=0, 1, \ldots, E-1$, wherein E denotes the rate matching output sequence length. The bit selection and pruning module 536 may generate the rate matching output bit sequence by the following algorithm.

```
Set k=0 and j=0
while {k < E}
    if w_{jmodK_w} ≠ < NULL >
        e_k = w_{jmodK_w}
        k=k+1
    end if
    j=j+1
end while.
```

Referring again to FIG. 2, if it is determined, at 212, that the number of UCI bits to be transmitted is greater than the payload capacity, then the method 200 may include, at 220, discarding CSI bits and coding ACK/NACK bits for transmission using PUCCH format 1b with channel selection. While some embodiments may include discarding ACK/NACK bits instead of CSI bits, typically the ACK/NACK bits are associated with a relatively higher priority and, therefore, will not be discarded.

In some embodiments, only some of the CSI bits may be discarded. In such cases, a dropping rule may be implemented in order to provide a relative priority among the CSI bits. For example, CSI may be prioritized according to a PUCCH reporting type associated with the specific CSI information. For example, reporting types 3 (RI), 5 (RI/first PMI), 6 (RI/PTI), and 2a (wideband first PMI), may be associated with a first priority; reporting types 2 (wideband CQI/PMI), 2b (wideband first PMI), 2c (wideband CQI, first PMI, second PMI), and 4 (wideband CQI) may be associated with a second priority; and reporting types 1 (sub-band CQI) and a (sub-band CQI/second PMI) may be associated with a third priority. The specific type of CSI is shown in parentheticals. Thus, the third priority CSI will be dropped before the second priority CSI and the second priority CSI will be dropped before the first priority CSI. Among reporting types with the same priority, priority of a cell may decrease as a corresponding serving cell index (for example, ServCellIndex) increases. That is, the lower the cell index, the higher the priority.

The coding of the ACK/NACK bits, and any remaining CSI and/or SR bits, may be done using RM coding or TBCC such as the coding shown and described above.

In some embodiments, if the number of UCI bits includes an SR bit and is greater than the payload size and if SR is positive, the ACK/NACK bits may be transmitted on the SR PUCCH resource and CSI can be dropped.

Figure 6:
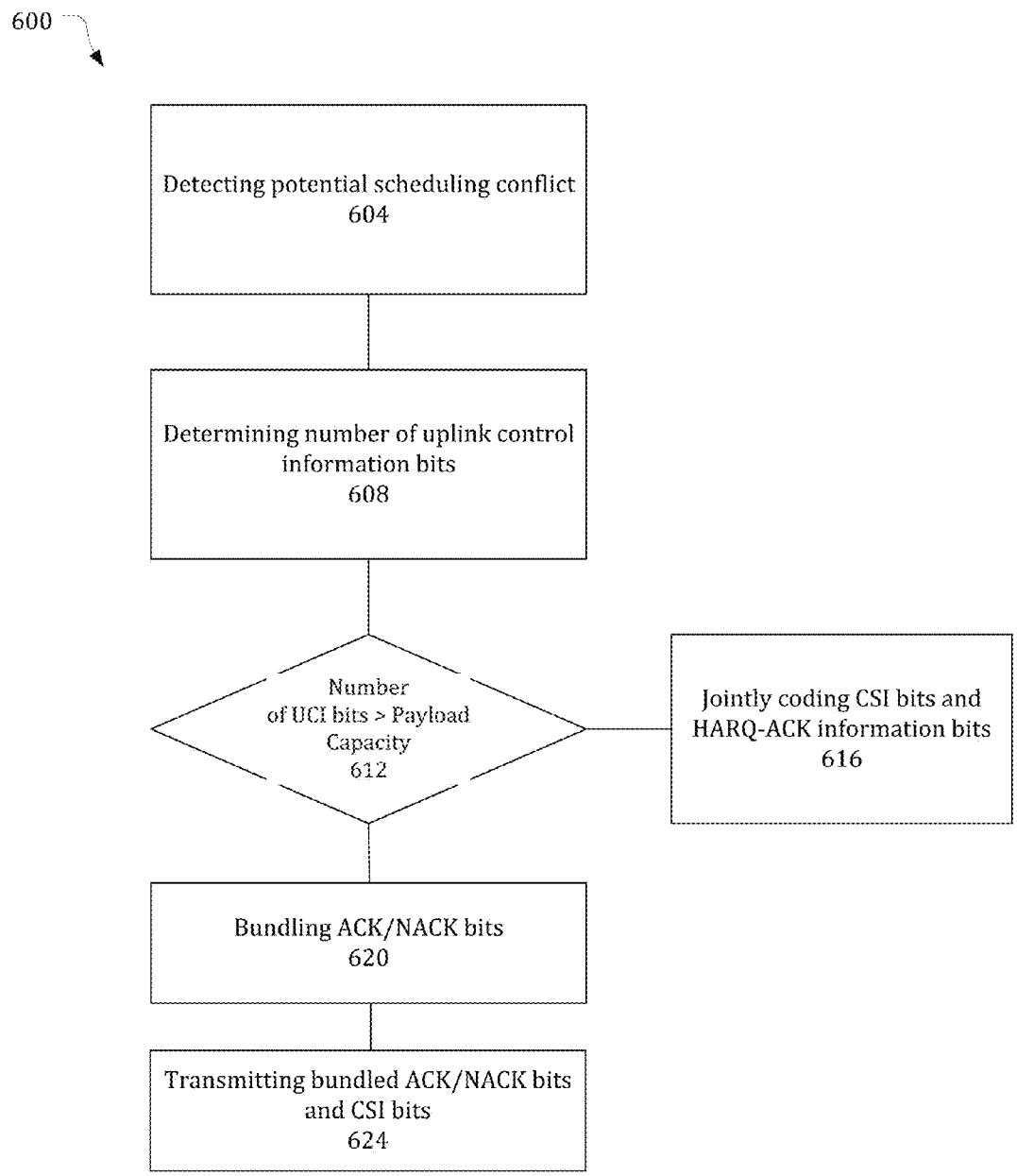
FIG. 6 illustrates a method of transmitting uplink control information (UCI) in accordance with various embodiments.

FIG. 6 illustrates a method 600 in accordance with other embodiments. Method 600 may be performed by a transmit module of a UE, such as transmit module 128 of UE 104. In some embodiments, the UE may include and/or have access to one or more computer-readable media having instructions stored thereon, that, when executed, cause the UE, or the transmit module 128, to perform some or all of the method 600.

At 604, the method 600 may include detecting a potential scheduling conflict. As mentioned above, a potential scheduling conflict may occur when the CSI bit stream is to be transmitted using PUCCH format 2 and the HARQ bit stream is to be transmitted using PUCCH format 1b with channel selection.

At 608, the method 600 may include determining a number of UCI bits to be transmitted in a PUCCH transmission of a subframe.

At 612, the method 600 may include determining whether the number of UCI bits is greater than a payload capacity of the PUCCH transmission of a subframe. In various embodiments, a payload capacity of a PUCCH format 2 transmission may be 13 bits, given capabilities of presently-available RM coding.

If it is determined that the number of UCI bits to be transmitted is not greater than the payload capacity, then the method 600 may include, at 616, jointly coding CSI bits and ACK/NACK bits. This may be done similar to that described above with respect to 216 of method 200.

If it is determined, at 612, that the number of UCI bits to be transmitted is greater than the payload capacity, then the method 600 may include, at 620, bundling ACK/NACK bits. In some embodiments, if the number of ACK/NACK bits is more than two, they may be compressed (or bundled) to make the number of ACK/NACK bits no more than two.

If transmit module is configured for frequency division duplexing (FDD), spatial bundling per serving cell may be applied. A most significant bit (MSB) may represent spatial-bundled HARQ-ACK for a primary cell (PCell) and a least significant bit (LSB) may represent spatial-bundled HARQ-ACK for a secondary cell (SCell). The bundling may be done by a logical AND operation. For example, an ACK and NACK/discontinuous transmission (DTX) may be mapped to 1 and 0, respectively. The logical AND operation for the bit representation may then be applied as follows:

ACK, ACK→bundled HARQ-ACK is ACK;

ACK, NACK/DTX→bundled HARQ-ACK is NACK;

NACK/DTX, ACK→bundled HARQ-ACK is NACK; and

NACK/DTX, NACK/DTX→bundled HARQ-ACK is NACK.

Thus, four ACK/NACK bits (two for the PCell and two for the SCell) may be compressed to two bundled ACK/NACK bits (one for the PCell and one for the SCell).

While the above bundling describes use of a logical AND operation, other embodiments may use other logical operations, such as a logical OR operation.

If transmit module is configured for time division duplexing (TDD), the number of an ACK counter may be used for the bundling operation. The value of b(0), b(1) may be generated according to Table 4 from $$N_{SPS} + \sum_{c=0}^{N_{cells}^{DL}-1} U_{DAI,c}$$

HARQ-ACK responses including ACK in response to PDCCH indicating downlink SPS release by spatial HARQ-ACK bundling across multiple codewords within each PDSCH transmission for all serving cells $N_{cells}^{DL}$. For TDD UL-DL configuration 1-6, if $$\sum_{c=0}^{N_{cells}^{DL}-1} U_{DAI,c} > 0 \text{ and } V_{DAI,c}^{DL} \neq (U_{DAI,c} - 1)$$

mod 4+1 for a serving cell c, the UE may detect that at least one downlink assignment has been missed.

TABLE 4

Mapping between multiple HARQ-ACK responses and b(0),b(1)

| Number of ACK among multiple $\left(N_{SPS} + \sum_{c=0}^{N_{cells}^{DL}-1} U_{DAI,c}\right)$ HARQ − ACK responses | b(0),b(1) |
|---|---|
| 0 or None (UE detect at least one DL assignment is missed) | 0,0 |
| 1 | 1,1 |
| 2 | 1,0 |
| 3 | 0,1 |
| 4 | 1,1 |
| 5 | 1,0 |
| 6 | 0,1 |
| 7 | 1,1 |
| 8 | 1,0 |
| 9 | 0,1 |

$N_{SPS}$ may be the number of PDSCH transmissions without a corresponding PDCCH within the subframe(s) n−k in serving cell c, where k∈K (0 or 1).

$N_{cells}^{DL}$ may be the number of configured DL serving cells (with channel selection, this value is 2).

$V_{DAI,c}^{DL}$ may be the value of the downlink assignment index (DAI) in PDCCH with DCI format 1/1A/1B/1D/2/2A/2B/2C detected by the UE according to Table 5 in subframe n−$k_m$ in serving cell c, where $k_m$ is the smallest value in the set K, defined in Table 6 such that the UE detects a DCI format 1/1A/1B/1D/2/2A/2B/2C as defined in 3GPP TS 36.213.

TABLE 5

Value of Downlink Assignment Index

| DAI MSB, LSB | $V_{DAI}^{UL}$ or $V_{DAI}^{DL}$ | Number of subframes with PDSCH transmission and with PDCCH/EPDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

TABLE 6

Downlink association set index K: for $\{k_0, k_1, \ldots k_{M-1}\}$ TDD

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

$U_{DAI,c}$ may be the total number of PDCCH(s) with assigned PDSCH transmission(s) and PDCCH indicating downlink SPS release detected by the UE within the subframe(s) n-k in serving cell c, where k∈K Referring again to FIG. 6, upon bundling the ACK/NACK bits at 620, the method 600 may include, at 624, transmitting the bundled ACK/NACK bits and the CSI bits. The bundled HARQ-ACK may be transmitted either by phase modulation on a second reference signal (RS) using PUCCH format 2 or by joint coding of the CSI and the bundled HARQ-ACK using PUCCH format 2. The joint coding may be TBCC, RM coding, or dual RM coding, similar to that described above In another embodiment, the phase modulation process may be used for normal CP case and the joint coding process, for example TBCC, may be used for extended CP since the number of RS symbols in a slot for extended CP is one that is not available for RS modulation. This embodiment may be described in further detail below with respect to FIG. 8. If SR is also part of the UCI, then the SR may be treated as a part of the ACK/NACK bits. If an SR bit is not part of the UCI and a scheduling request is positive, then the bundled HARQ-ACK may be transmitted on an SR resource.

In some embodiments, phase modulation may be applied as follows. For PUCCH formats 2a and 2b, supported for normal cyclic prefix only, the bits $b(20), \ldots, b(M_{bit}-1)$ may be modulated as described in Table 7 resulting in a single modulation symbol d(10) used in the generation of the reference signal for PUCCH format 2a and 2b. Since the above-bundled HARQ-ACK bits may be two, $M_{bit}$ may be 22. That is, b(20) and b(21) may be bundled HARQ-ACK bits.

TABLE 7

Modulation symbol d(10) for PUCCH formats 2a and 2b

| PUCCH format | $b(20), \ldots, b(M_{bit} - 1)$ | d(10) |
|---|---|---|
| 2a | 0 | 1 |
| | 1 | −1 |
| 2b | 00 | 1 |
| | 01 | −j |
| | 10 | j |
| | 11 | −1 |

Figure 7:
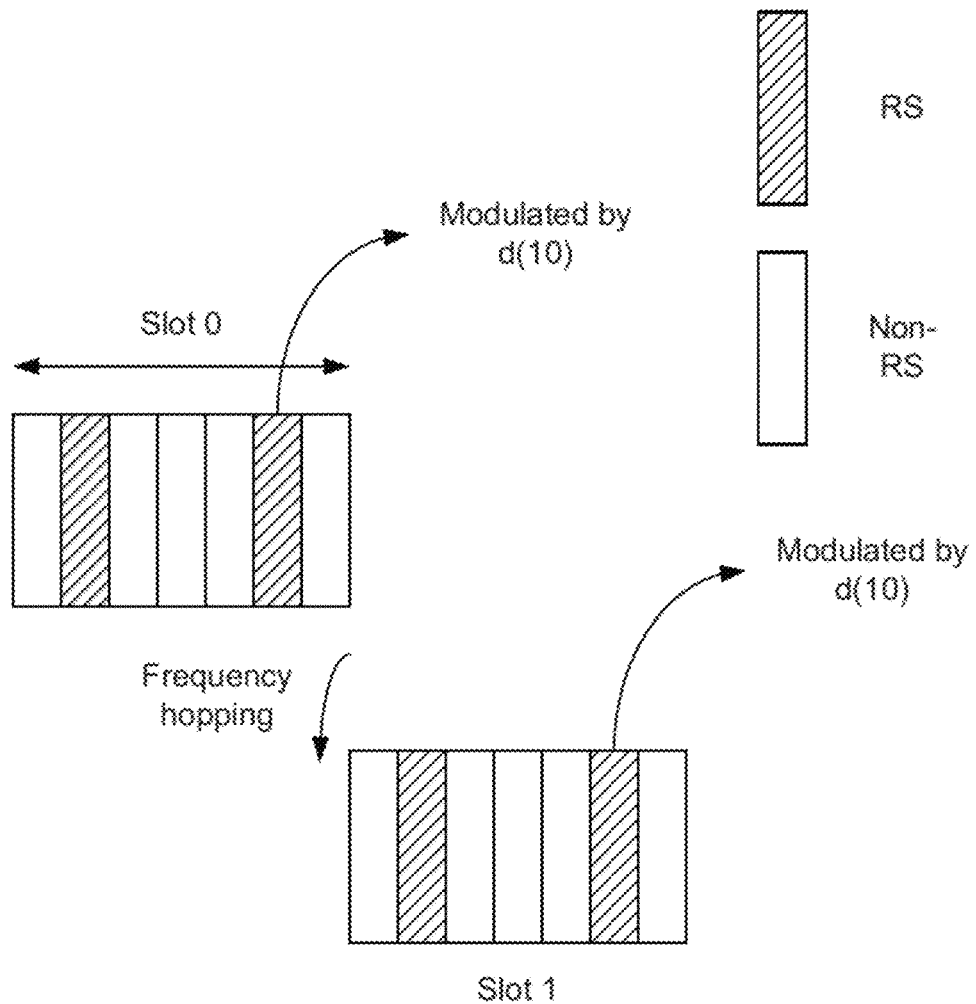
FIG. 7 illustrates phase modulation concepts in accordance with various embodiments.

FIG. 7 illustrates phase modulation using PUCCH format 2b in accordance with some embodiments. As can be seen in FIG. 7, the second RS of each slot may be modulated by d(10) to transmit the bundled HARQ-ACK.

In still another embodiment, for normal CP, a hybrid scheme may be used, while joint coding is used for extended CP. A hybrid scheme may involve a first operation in which HARQ-ACK mapped states are developed using, for example, time-domain compression. This may result in four bundled ACK/NACK bits, $b_0$, $b_1$, $b_2$, and $b_3$. A first set of the bundled ACK/NACK bits, for example, two bits, $b_0$ and $b_1$, may be jointly coded with CSI bits, while a second set of the bundled ACK/NACK bits, for example, the remaining two bits, $b_2$ and $b_3$, may be separately coded. The encode first set may be moduled on a non-referency symbol, while the second encoded set may modulated with an RS symbol in a second slot of PUCCH format 2.

The above methods 200 and 600 respectively describe that, when a number of UCI bits is greater than a payload capacity of a PUCCH format 2 transmission, for example, the CSI bits may be dropped or the ACK/NACK bits may be bundeled. However, in other embodiments, the UCI bits may be jointly coded using TBCC, which in some embodiments may be capable of increasing payload capacity to 15 or even 20 bits.

Figure 8:
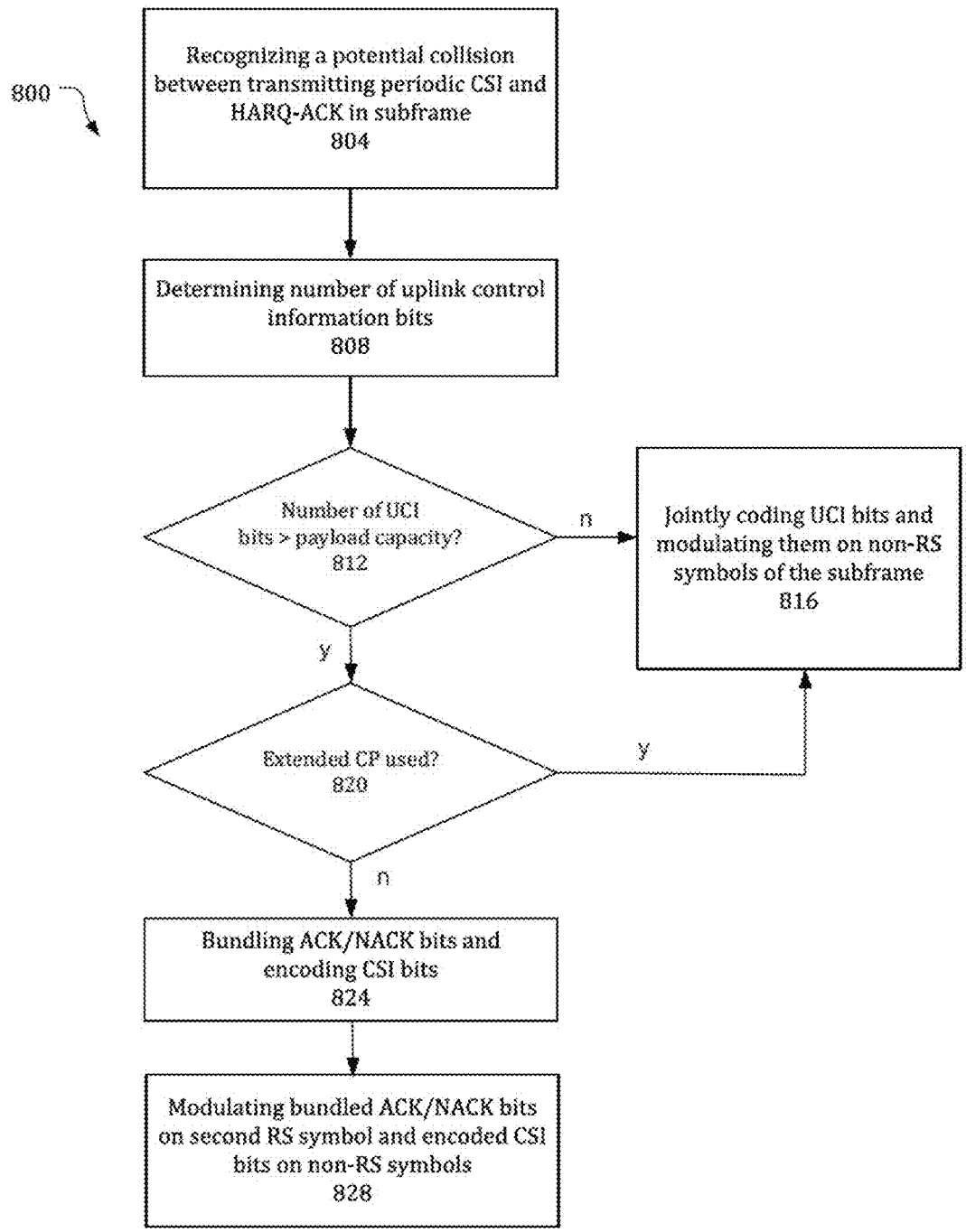
FIG. 8 illustrates a method of transmitting UCI in accordance with various embodiments.

FIG. 8 illustrates a method 800 in accordance with another embodiment. Method 200 may be performed by a transmit module of a UE, such as transmit module 128 of UE 104. In some embodiments, the UE may include and/or have access to one or more computer-readable media having instructions stored thereon, that, when executed, cause the UE, or the transmit module 128, to perform some or all of the method 200.

The method 800 may include, at 804, recognizing a potential collision between transmitting periodic CSI and HARQ-ACK in a subframe. In some embodiments, this may be similar to determining a potential scheduling conflict as discussed above.

At 808, the method 800 may include determining a number of UCI bits to be transmitted.

At 812, the method 800 may include determining whether a number of UCI bits is greater than a payload capacity of a subframe using PUCCH format 2, for example.

If, at 812, it is determined that the number of UCI bits is not greater than the payload capacity, then the method 800 may include, at 816, jointly coding the UCI bits, using TBCC, for example, and modulating them on non-reference symbols of the subframe. Other embodiments described herein may similarly modulate the jointly coded UCI bits on the non-reference symbols of the subframe.

If, at 812, it is determined that the number of UCI bits is greater than the payload capacity, then the method 800 may include, at 820, determining whether an extended CP is used.

If, at 820, it is determined that an extended CP is used, then the method 800 may loop back to jointly coding the UCI bits and modulating them on non-reference symbols of the subframe at 816.

If, at 820, it is determined that an extended CP is not used (for example, a normal CP is used), then the method may include, at 824, bundling ACK/NACK bits and encoding CSI bits.

Following 824, the method 800 may include, at 828, modulating bundled ACK/NACK bits on second reference symbol of the subframe and encoded CSI bits on non-reference symbols.

In a general HARQ-ACK procedure, the HARQ-ACK codebook size may be determined by a radio resource control (RRC) configuration level such as the number of configured serving cells and configured transmission modes. On the other hand, the CSI reporting may be done for the activated cells only by a media access control (MAC) control element (CE). In general, the change by the MAC CE is more frequent than by RRC. In Rel-10 of 3GPP LTE-A, the CSI reporting in a transient period by activation/deactivation may be ignored by the eNB since the information may not be available until the eNB knows the UE successfully receives the MAC CE. However, with joint coding of HARQ-ACK and CSI, the contents may not be easily ignored because the HARQ-ACK may not be ignored due to its importance. These situations may be handled as follows. As used below, "multiplexing of CSI and HARQ-ACK" may refer to jointly encoding CSI and ACK/NACK bits, for example.

In some embodiments, in case of multiplexing of CSI and HARQ-ACK information, the payload size may be a predetermined value, for example, 13 bits, that corresponds to the payload capacity of PUCCH format 2. Any remaining information bits, other than CSI and ACK/NACK bits, may be padded by a predetermined bit or bit pattern, for example, all '0'. An eNB may decode the PUCCH based on the predetermined value. Thus, even if the eNB assumes a wrong CSI payload size, the HARQ-ACK information can survive.

In some embodiments, in case of multiplexing of CSI and HARQ-ACK, a concatenation may be performed according to a predefined order to ensure the reliability of the HARQ-ACK information. In such embodiments, the CSI bits may be appended at an end of a sequence of concatenated ACK/NACK bits.

In some embodiments, in case of multiplexing of CSI and HARQ-ACK, the multiplexed CSI may always be for the PCell. In particular, this may be done for the CC activation/deactivation ambiguity period. As the PCell will not be deactivated, there will be no ambiguity. If the subframe in which the CSI and HARQ-ACK is to be transmitted is not for CSI reporting for the PCell, the payload for CSI may be reserved, zero-padded, or predetermined value-padded. Alternatively, if the subframe in which the CSI and HARQ-ACK is to be transmitted is not for CSI reporting for the PCell, the CSI content may be dropped and the HARQ-ACK information may be transmitted by PUCCH format 1b with channel selection.

In some embodiments, in case of multiplexing of CSI and HARQ-ACK, the jointly-coded CSI may be for a serving cell that is predetermined or RRC-configured. In particular, this may be useful during the CC activation/deactivation ambiguity period. If the subframe in which the CSI and HARQ-ACK is to be transmitted is not for CSI reporting for the configured (or predetermined) SCell, the payload for CSI may be reserved, zero-padded, or predetermined value-padded. Alternatively, if the subframe in which the CSI and HARQ-ACK is to be transmitted is not for CSI reporting for the configured (or predetermined) SCell, the CSI content may be dropped and the HARQ-ACK information may be transmitted by PUCCH format 1b with channel selection.

In some embodiments, the multiplexing of CSI and HARQ-ACK may be done only when the CSI reporting is to be done for the predetermined serving cell(s). In particular, this may be useful during the CC activation/deactivation ambiguity period. The predetermined serving cells may be predetermined by a technical specification, primary cell (or cell with the lowest cell index), or RRC-configured cell(s). When CSI reporting is not to be done for the predetermined serving cell(s), the CSI may be dropped and the HARQ-ACK may be done by PUCCH format 1b with channel selection, or other multiplexing methods may be used, for example, phase modulation for bundled ACK/NACK on the second RS in a slot or joint coding of CSI and bundled ACK/NACK.

Figure 9:
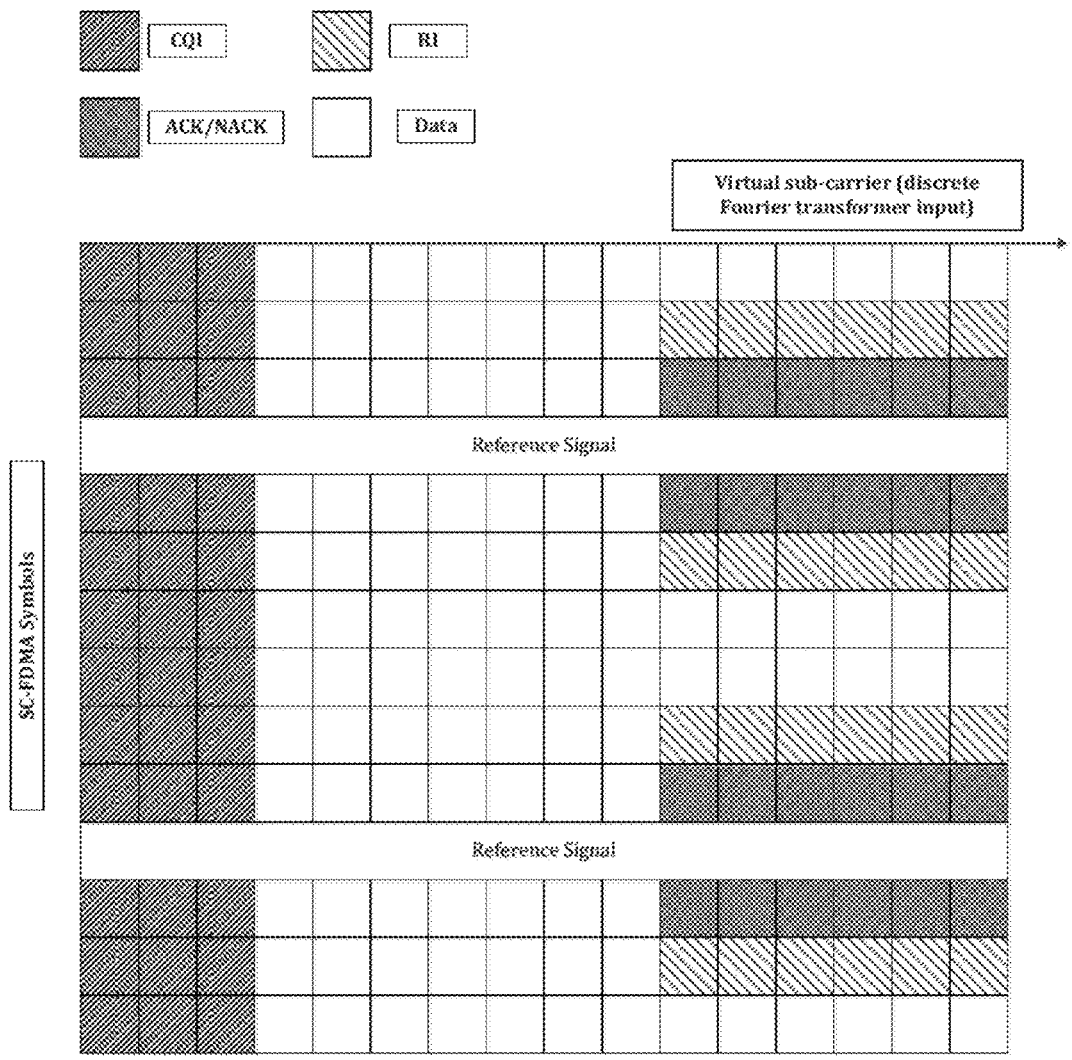
FIG. 9 illustrates multiplexing of UCI on PUSCH in accordance with various embodiments.

FIG. 9 illustrates multiplexing of UCI on PUSCH (for normal CP) in accordance with some embodiments. FIG. 9 illustrates resource blocks of a subframe. The RBs may include one or more single-carrier (SC) frequency division multiple access (FDMA) symbols over one or more virtual sub-carriers (discrete Fourier transform (DFT) input).

If a UE is not configured by simultaneous transmission of PUSCH and PUCCH and if PUSCH is transmitted on the subframe that is also transmitted by PUCCH that contains periodic CSI and/or ACK/NACK bits, the CSI and/or ACK/NACK bits may be piggybacked on PUSCH together with the UL-SCH.

The periodic CSI and the HARQ-ACK may be piggybacked on PUSCH as seen in FIG. 9. The piggybacked HARQ-ACK may be either original HARQ-ACK for PUCCH format 1b with channel selection or bundled HARQ-ACK depending on the use case. Alternatively, individual ACK/NACK bits as in PUCCH format 3 may be piggybacked on PUSCH.

Figure 10:
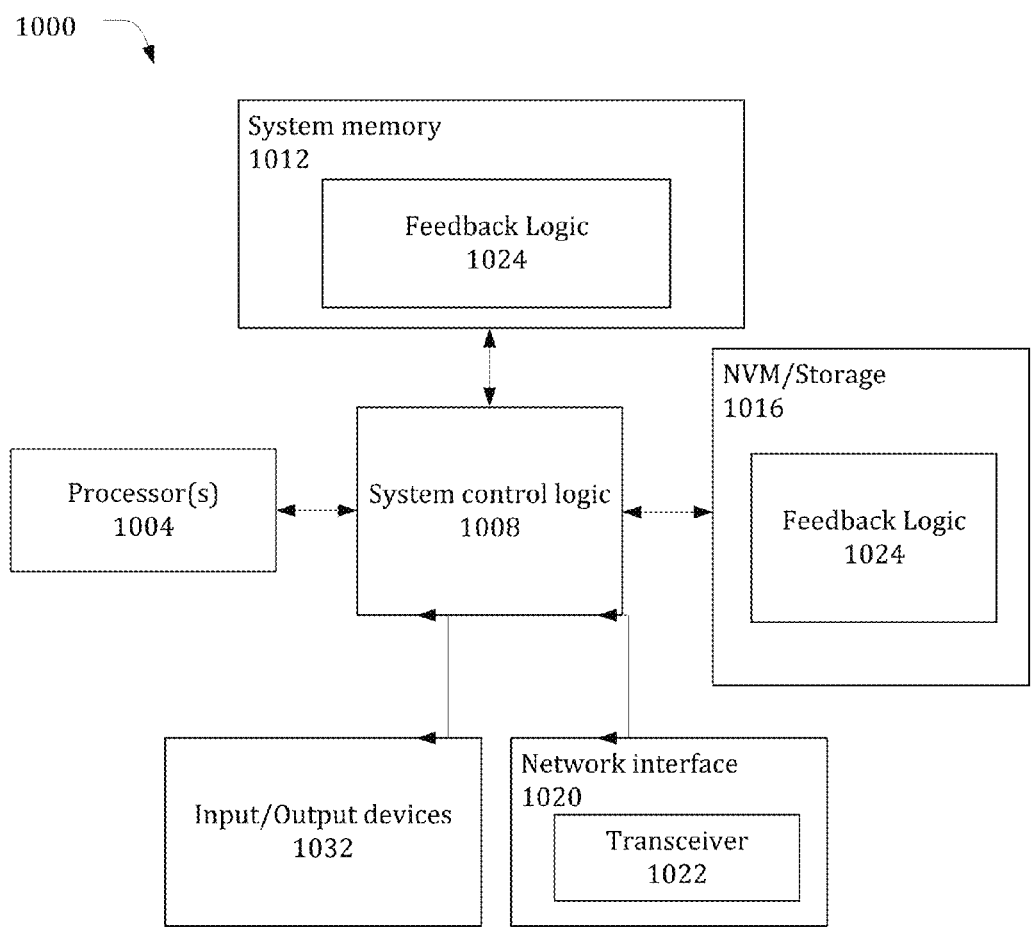
FIG. 10 schematically depicts an example system in accordance with various embodiments.

The UE 104 described herein may be implemented into a system using any suitable hardware and/or software to configure as desired. FIG. 10 illustrates, for one embodiment, an example system 1000 comprising one or more processor(s) 1004, system control logic 1008 coupled with at least one of the processor(s) 1004, system memory 1012 coupled with system control logic 1008, non-volatile memory (NVM)/storage 1016 coupled with system control logic 1008, a network interface 1020 coupled with system control logic 1008, and input/output (I/O) devices 1032 coupled with system control logic 1008.

The processor(s) 1004 may include one or more single-core or multi-core processors. The processor(s) 1004 may include any combination of general-purpose processors and dedicated processors (e.g., graphics processors, application processors, baseband processors, etc.).

System control logic 1008 for one embodiment may include any suitable interface controllers to provide for any suitable interface to at least one of the processor(s) 1004 and/or to any suitable device or component in communication with system control logic 1008.

System control logic 1008 for one embodiment may include one or more memory controller(s) to provide an interface to system memory 1012. System memory 1012 may be used to load and store data and/or instructions, e.g., feedback logic 1024. System memory 1012 for one embodiment may include any suitable volatile memory, such as suitable dynamic random access memory (DRAM), for example.

NVM/storage 1016 may include one or more tangible, non-transitory computer-readable media used to store data and/or instructions, e.g., feedback logic 1024. NVM/storage 1016 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1016 may include a storage resource physically part of a device on which the system 1000 is installed or it may be accessible by, but not necessarily a part of, the device. For example, the NVM/storage 1016 may be accessed over a network via the network interface 1020 and/or over Input/Output (I/O) devices 1032.

The feedback logic 1024 may include instructions that, when executed by one or more of the processors 1004, cause the system 1000 to perform feedback of UCI as described with respect to the above embodiments. In various embodiments, the feedback logic 1024 may include hardware, software, and/or firmware components that may or may not be explicitly shown in system 1000.

Network interface 1020 may have a transceiver 1022 to provide a radio interface for system 1000 to communicate over one or more network(s) and/or with any other suitable device. In various embodiments, the transceiver 1022 may be integrated with other components of system 1000. For example, the transceiver 1022 may include a processor of the processor(s) 1004, memory of the system memory 1012, and NVM/Storage of NVM/Storage 1016. Network interface 1020 may include any suitable hardware and/or firmware. Network interface 1020 may include a plurality of antennas to provide a multiple input, multiple output radio interface. Network interface 1020 for one embodiment may include, for example, a wired network adapter, a wireless network adapter, a telephone modem, and/or a wireless modem.

For one embodiment, at least one of the processor(s) 1004 may be packaged together with logic for one or more controller(s) of system control logic 1008. For one embodiment, at least one of the processor(s) 1004 may be packaged together with logic for one or more controllers of system control logic 1008 to form a System in Package (SiP). For one embodiment, at least one of the processor(s) 1004 may be integrated on the same die with logic for one or more controller(s) of system control logic 1008. For one embodiment, at least one of the processor(s) 1004 may be integrated on the same die with logic for one or more controller(s) of system control logic 1008 to form a System on Chip (SoC).

In various embodiments, the I/O devices 1032 may include user interfaces designed to enable user interaction with the system 1000, peripheral component interfaces designed to enable peripheral component interaction with the system 1000, and/or sensors designed to determine environmental conditions and/or location information related to the system 1000.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1020 to communicate with components of a positioning network, e.g., a global positioning system (GPS) satellite.

In various embodiments, the system 1000 may be a mobile computing device such as, but not limited to, a laptop computing device, a tablet computing device, a netbook, a smartphone, etc. In various embodiments, system 1000 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Some non-limiting examples are provide below.

Example 1 includes an apparatus for transmitting uplink control information comprising: a hybrid automatic repeat request-acknowledgement (HARQ-ACK) module to generate a HARQ-ACK bit stream to indicate whether downlink data was successfully received on a physical downlink shared channel (PDSCH); a channel state indicator module (CSI) to generate a CSI bit stream that relates to a channel state; and a transmit module coupled with the HARQ-ACK module to receive the HARQ-ACK bit stream and further coupled with the CSI module to receive the CSI bit stream, the transmit module to: jointly code the HARQ-ACK bit stream and the CSI bit stream on a physical uplink control channel (PUCCH) transmission if the number of uplink control information (UCI) bits, which include bits of the HARQ-ACK bit stream and the CSI bit stream, to be transmitted is not greater than a payload capacity of the PUCCH transmission; and discard at least some bits of the CSI bit stream or bundle at least some of the bits of the HARQ-ACK bit stream if the number of UCI bits is greater than the payload capacity.

Example 2 includes the apparatus of example claim 1, wherein if the number of the UCI bits is less than or equal to the payload capacity, the transmit module is to jointly code the bits of the HARQ-ACK bit stream and the CSI bit stream with a Reed-Muller (RM) code.

Example 3 includes the apparatus of example 2, wherein the RM code is a dual RM code.

Example 4 includes the apparatus of example 3, wherein the transmit module further comprises: a first RM encoder module to code a first segment of a UCI bit stream; and a second RM encoder module to code a second segment of the UCI bit stream.

Example 5 includes the apparatus of example 4, wherein the first segment is bits of the CSI bit stream and the second segment is bits of the HARQ-ACK bit stream.

Example 6 includes the apparatus of example 1, wherein the number of the UCI bits is less than or equal to the payload capacity and the transmit module is to jointly code the bits of the HARQ-ACK bit stream and the CSI bit stream with a tailbiting convolutional code (TBCC).

Example 7 includes the apparatus of example 1, wherein the PUCCH transmission is a PUCCH Format 2 transmission.

Example 8 includes the apparatus of any of examples 1-7, wherein the UCI bits includes a scheduling request (SR) bit that indicates a positive SR, the number of UCI bits is greater than the payload capacity, and the transmit module is further to: transmit bits of the HARQ-ACK bit stream on an SR PUCCH and drop the bits of the CSI bit stream.

Example 9 includes an apparatus for transmitting uplink control information comprising: a hybrid automatic repeat request-acknowledgement (HARQ-ACK) module to generate a HARQ-ACK bit stream to indicate whether downlink data was successfully received on a physical downlink shared channel (PDSCH); a channel state indicator module (CSI) to generate a CSI bit stream that relates to a channel state; and a transmit module coupled with the HARQ-ACK module to receive the HARQ-ACK bit stream and further coupled with the CSI module to receive the CSI bit stream, the transmit module to:

detect a potential scheduling conflict between a hybrid automatic repeat request-acknowledgement (HARQ-ACK) transmission using channel selection and a channel state information (CSI) transmission; and jointly code, based on detection of a potential scheduling conflict CSI bits of the CSI transmission and ACK/NACK bits of the HARQ-ACK transmission, on a physical uplink control channel (PUCCH) of a subframe with a tailbiting convolutional code (TBCC).

Example 10 includes the apparatus of example 9, wherein the PUCCH transmission is a PUCCH Format 2 transmission.

Example 11 includes the apparatus of example 9, wherein the transmit module comprises: an encoder section to generate a plurality of output streams based on the CSI bit stream and the HARQ-ACK bit stream; and a rate matcher coupled with the encoding section to receive the plurality of output streams and to generate a serial output bit sequence based on the plurality of output streams.

Example 12 includes the apparatus of example 11, wherein the encoding section comprises: a plurality of delay elements serially coupled with one another; and a plurality of adder elements coupled with the plurality of delay elements.

Example 13 includes the apparatus of example 11, wherein the rate matcher comprises: a plurality of sub-block interleaver modules to respectively receive the plurality of output streams from the encoder section and to provide a respective plurality of interleaved streams; a bit collection module coupled with the plurality of sub-block interleaver modules to receive the plurality of interleaved streams, to provide a virtual circular buffer to output a bit-collection bit stream; and a bit selection and pruning module coupled with the bit collection module to receive the bit-collection bit stream and provide a rate-matched output bit sequence.

Example 14 includes the apparatus of any of examples 9-13, wherein the TBCC has a constraint length of seven and a mother coding rate of 1/3.

Example 15 includes a method for transmitting uplink control information comprising: recognizing a potential collision between transmitting periodic channel state information (CSI) and transmitting hybrid automatic repeat request-acknowledgement (HARQ-ACK) in a subframe; determining a number of uplink control information (UCI) bits, which includes CSI bits of the CSI transmission and ACK/NACK bits of the HARQ-ACK transmission, to be transmitted in the subframe using a physical uplink control channel (PUCCH); if a normal cyclic prefix is used, modulating bundled ACK/NACK bits on a second reference signal (RS) symbol of the subframe and modulating, after channel coding, encoded CSI bits on non-RS symbols; and if an extended cyclic prefix is used, jointly coding the CSI bits and the ACK/NACK bits and modulating the jointly encoded CSI bits and ACK/NACK bits on non-RS symbols of the subframe.

Example 16 includes the method of example 15, wherein if a normal cyclic prefix is used, the method further comprises: bundling the ACK/NACK bits.

Example 17 includes the method of example 16, wherein a transmit module is configured for frequency division duplexing and the bundling of the ACK/NACK bits comprises: spatially bundling the ACK/NACK bits by having a most significant bit represent spatially-bundled HARQ-ACK for a primary cell and a least significant bit represent spatially-bundled HARQ-ACK for a secondary cell.

Example 18 includes the method of example 17, wherein the spatial bundling is based on a logical AND operation.

Example 19 includes the method of example 16, wherein a transmit module is configured for time division duplexing and the bundling of the ACK/NACK bits comprises: using a number of an ACK counter that tracks a number of ACKs among multiple HARQ-ACK responses to generate the bundled ACK/NACK bits.

Example 20 includes a system for wireless communications comprising: user interfaces that include a display, a speaker, and a microphone; and a communication device coupled with the user interfaces to transmit and receive data over a wireless network, the communication device including: a hybrid automatic repeat request-acknowledgement (HARQ-ACK) module to generate a HARQ-ACK bit stream to indicate whether downlink data was successfully received on a physical downlink shared channel (PDSCH); a channel state indicator module (CSI) to generate a CSI bit stream that relates to a channel state; and a transmit module coupled with the HARQ-ACK module to receive the HARQ-ACK bit stream and further coupled with the CSI module to receive the CSI bit stream, the transmit module to: if an extended cyclic prefix is used, jointly code bits of the HARQ-ACK bit stream and bits of the CSI bit stream; and if a normal cyclic prefix is used, jointly code a first set of bits of the HARQ-ACK bit stream with bits of the CSI bit stream and separately code a second set of bits of the HARQ-ACK bit stream.

Example 21 includes the system of example 20, wherein, if a normal cyclic prefix is used, the transmit module is further to: modulate jointly encoded first set of bits of the HARQ-ACK bit stream and bits of the CSI bit stream on a non-reference signal (RS) symbol of a subframe; and modulate the separately coded second set of bits of the HARQ-ACK bit stream on a RS symbol of the subframe.

Example 22 includes the system of example 21, wherein the reference signal symbol is in a second slot of the subframe.

Example 23 includes the system of example 20, wherein the transmit module is to jointly code the bits of the HARQ-ACK bit stream and bits of the CSI bit stream with a dual RM code.

Example 24 includes the system of example 20, wherein the transmit module is to jointly code the bits of the HARQ-ACK bit stream and the bits of the CSI bit stream with a tailbiting convolutional code (TBCC).

Example 25 includes the system of any of examples 20-24, wherein transmit module is to transmit the HARQ-ACK bit stream and the CSI bit stream on a physical uplink control channel (PUCCH) Format 2 transmission.

Example 26 includes an apparatus for transmitting uplink control information comprising: means for recognizing a potential collision between transmitting periodic channel state information (CSI) and transmitting hybrid automatic repeat request-acknowledgement (HARQ-ACK) in a subframe; means for determining a number of uplink control information (UCI) bits, which includes CSI bits of the CSI transmission and ACK/NACK bits of the HARQ-ACK transmission, to be transmitted in the subframe using a physical uplink control channel (PUCCH); if a normal cyclic prefix is used, means for modulating bundled ACK/NACK bits on a second reference signal (RS) symbol of the subframe and modulating, after channel coding, encoded CSI bits on non-RS symbols; and if an extended cyclic prefix is used, means for jointly coding the CSI bits and the ACK/NACK bits and modulating the jointly encoded CSI bits and ACK/NACK bits on non-RS symbols of the subframe.

Example 27 includes the apparatus of example 26, further comprising: means for bundling the ACK/NACK bits if a normal cyclic prefix is used.

Example 28 includes the apparatus of example 27, wherein the apparatus is configured for frequency division duplexing and further comprises: means for spatially bundling the ACK/NACK bits by having a most significant bit represent spatially-bundled HARQ-ACK for a primary cell and a least significant bit represent spatially-bundled HARQ-ACK for a secondary cell.

Example 29 includes the apparatus of example 28, wherein the spatial bundling is based on a logical AND operation.

Example 30 includes the apparatus of example 27, wherein the apparatus is configured for time division duplexing and further comprises: means for using a number of an ACK counter that tracks a number of ACKs among multiple HARQ-ACK responses to generate the bundled ACK/NACK bits.

Example 31 includes one or more computer readable media having instructions that, when executed, cause a communication device to jointly code bits of an hybrid automatic repeat request-acknowledgement (HARQ-ACK) bit stream and bits of a channel state information (CSI) bit stream if an extended cyclic prefix is used; and jointly code a first set of bits of the HARQ-ACK bit stream with bits of the CSI bit stream and separately code a second set of bits of the HARQ-ACK bit stream if a normal cyclic prefix is used.

Example 32 includes the one or more computer readable media of example 31, wherein, if a normal cyclic prefix is used, the instructions further cause the device to: modulate jointly encoded first set of bits of the HARQ-ACK bit stream and bits of the CSI bit stream on a non-reference signal (RS) symbol of a subframe; and modulate the separately coded second set of bits of the HARQ-ACK bit stream on a RS symbol of the subframe.

Example 33 includes the one or more computer-readable media of example 32, wherein the reference signal symbol is in a second slot of the subframe.

Example 34 includes an apparatus for transmitting uplink control information comprising: means for generating a HARQ-ACK bit stream to indicate whether downlink data was successfully received on a physical downlink shared channel (PDSCH); means for generating a CSI bit stream that relates to a channel state; and means for detecting a potential scheduling conflict between a hybrid automatic repeat request-acknowledgement (HARQ-ACK) transmission using channel selection and a channel state information (CSI) transmission; and jointly coding, based on detection of a potential scheduling conflict CSI bits of the CSI transmission and ACK/NACK bits of the HARQ-ACK transmission, on a physical uplink control channel (PUCCH) of a subframe with a tailbiting convolutional code (TBCC).

What is claimed is:

1. One or more non-transitory computer readable media having instructions that, when executed, cause a communication device to:
   identify periodic channel state information (CSI) and hybrid automatic repeat request-acknowledgement (HARQ-ACK) for transmission in a same subframe;
   identify uplink control information (UCI) bits, which include CSI bits of a CSI bit stream and acknowledgement/negative acknowledgement (ACK/NACK) bits of a HARQ-ACK bit stream, to be transmitted in the subframe with utilization of a physical uplink control channel (PUCCH);
   identify whether a number of the UCI bits is greater than a threshold;
   if the number is not greater than the threshold, transmit the UCI bits with the CSI bits appended to the ACK/NACK bits; and
   if the number is greater than the threshold, select a subset of the CSI bits and transmit a portion of the UCI bits with the selected CSI bits appended to the ACK/NACK bits.

2. The one or more non-transitory computer readable media of claim 1, wherein the portion of the UCI bits includes one or more scheduling request (SR) bits.

3. The one or more non-transitory computer readable media of claim 1, wherein the instructions are further to cause the communication device to select the subset based on cell index values.

4. The one or more non-transitory computer readable media of claim 1, wherein the instructions are further to cause the communication device to:
   if the number is not greater than the threshold, modulate the ACK/NACK bits on a reference signal (RS) symbol of the subframe and modulate the CSI bits on non-RS symbols of the subframe; and
   if the number is greater than the threshold, modulate the ACK/NACK bits and the selected CSI bits on the non-RS symbols of the subframe.

5. The one or more non-transitory computer readable media of claim 1, wherein the threshold is based on payload capacity of the subframe.

6. The one or more non-transitory computer readable media of claim 1, wherein the instructions are further to cause the communication device to:
   if the number is greater than the threshold, determine whether an extended cyclic prefix (CP) is used; and
   in response to a determination that extended CP is used, modulate the ACK/NACK bits and the selected CSI bits on non-RS symbols of the subframe.

7. The one or more non-transitory computer readable media of claim 6, wherein the instructions are further to cause the communication device to:
   in response to a determination that extended CP is not used, modulate the ACK/NACK bits on an RS symbol of the subframe and modulate the selected CSI bits on the non-RS symbols of the subframe.

8. The one or more non-transitory computer readable media of claim 1, wherein the CSI bits include the selected subset and a different subset, and wherein the instructions are further to cause the communication device to discard the different subset of the CSI bits.

9. The one or more non-transitory computer readable media of claim 1, wherein the instructions are further to cause the communication device to operate in a frequency division duplex mode to spatially bundle the ACK/NACK bits prior to transmit the UCI bits.

10. The one or more non-transitory computer readable media of claim 1, wherein the instructions further cause the communication device to:
    ascertain whether the CSI bit stream is to be transmitted with utilization of PUCCH 2 format and the HARQ-ACK bit stream is to be transmitted with utilization of PUCCH format 1b with channel selection; and
    identify whether the number of the UCI bits is greater than the threshold responsive to an ascertainment that the CSI bit stream is to be transmitted with utilization of PUCCH 2 format and the HARQ-ACK bit stream is to be transmitted with utilization of PUCCH format 1b with channel selection.

11. The one or more non-transitory computer readable media of claim 1, wherein instructions further cause the communication device to:
    ascertain whether a value of a parameter of radio resource control (RRC) signaling is equal to a predetermined value; and
    perform detection of a potential scheduling conflict if the value of the parameter is equal to the predetermined value.

12. The one or more non-transitory computer readable media of claim 11, wherein the instructions further cause the communication device to identify whether the number of the UCI bits is greater than the threshold responsive to a result of the detection.

13. The one or more non-transitory computer readable media of claim 11, wherein the parameter is a simultaneous ACK/NACK and channel quality indicator (CQI) parameter.

14. The one or more non-transitory computer readable media of claim 11, wherein the predetermined value is one.

15. The one or more non-transitory computer readable media of claim 11, wherein the parameter indicates at least one of whether the CSI bit stream is to be transmitted with utilization of PUCCH 2 format or the HARQ-ACK bit stream is to be transmitted with utilization of PUCCH format 1b with channel selection.

16. An apparatus to be included in user equipment (UE), the apparatus comprising:
    first circuitry to provide periodic channel state information (CSI) and hybrid automatic repeat request-acknowledgement (HARQ-ACK) for transmission in a same subframe; and
    the first circuitry further to provide uplink control information (UCI) bits, which include CSI bits of a CSI bit stream and acknowledgement/negative acknowledgement (ACK/NACK) bits of a HARQ-ACK bit stream, to be transmitted in the subframe with utilization of a physical uplink control channel (PUCCH); and
    second transmit circuitry coupled to the first circuitry, the second transmit circuitry to:
        identify whether a number of the UCI bits is greater than a threshold;
        if the number is not greater than the threshold, transmit the UCI bits with the CSI bits appended to the ACK/NACK bits to an evolved node B (eNB); and
        if the number is greater than the threshold, select a subset of the CSI bits and transmit a portion of the UCI bits with the selected CSI bits appended to the ACK/NACK bits to the eNB.

17. The apparatus of claim 16, wherein the portion of the UCI bits includes one or more scheduling request (SR) bits.

18. The apparatus of claim 16, wherein the second transmit circuitry is further to select the subset based on cell index values.

19. The apparatus of claim 16, wherein the second transmit circuitry is further to:
    if the number is not greater than the threshold, modulate the ACK/NACK bits on a reference signal (RS) symbol of the subframe and modulate the CSI bits on non-RS symbols of the subframe; and
    if the number is greater than the threshold, modulate the ACK/NACK bits and the selected CSI bits on the non-RS symbols of the subframe.

20. The apparatus of claim 16, wherein the threshold is based on payload capacity of the subframe.

21. The apparatus of claim 16, wherein the second transmit circuitry is further to:
    if the number is greater than the threshold, determine whether an extended cyclic prefix (CP) is used; and
    in response to a determination that extended CP is used, modulate the ACK/NACK bits and the selected CSI bits on non-RS symbols of the subframe.

22. The apparatus of claim 21, wherein the second transmit circuitry is further to:
    in response to a determination that extended CP is not used, modulate the ACK/NACK bits on an RS symbol of the subframe and modulate the selected CSI bits on the non-RS symbols of the subframe.

23. The apparatus of claim 16, wherein the CSI bits include the selected subset and a different subset, and the second transmit circuitry is further to discard the different subset of the CSI bits.

24. The apparatus of claim 16, wherein the second transmit circuitry is further to:
    ascertain whether the CSI bit stream is to be transmitted with utilization of PUCCH 2 format and the HARQ-ACK bit stream is to be transmitted with utilization of PUCCH format 1b with channel selection; and
    identify whether the number of the UCI bits is greater than the threshold responsive to an ascertainment that the CSI bit stream is to be transmitted with utilization of PUCCH 2 format and the HARQ-ACK bit stream is to be transmitted with utilization of PUCCH format 1b with channel selection.

25. The apparatus of claim 16, wherein the second transmit circuitry is further to operate in a frequency division duplex mode to spatially bundle the ACK/NACK bits prior to transmit the UCI bits.

* * * * *